3,654,152
PROCESS FOR MAKING DETERGENT INHIBITING ADDITIVES
Jean Corringer, Oxford, England, and Jean Fourreau, Caudebec-en-Caux, France, assignors to Esso Chimie, Courbevoie, Hauts-de-Seine, France
No Drawing. Filed Aug. 7, 1969, Ser. No. 848,350
Claims priority, application France, Aug. 20, 1968, 163,490
Int. Cl. C10m 1/46
U.S. Cl. 252—32.7         9 Claims

ABSTRACT OF THE DISCLOSURE

A process of preparing a detergent inhibitor additive which consists of a colloidal dispersion of alkali metal or alkaline earth metal salt in an oil solution of an alkyl phenol and a thiophosphonic acid. In this process alkali metal base or alkaline earth metal base is treated with $CO_2$ in a mixture of alkyl phenol and oil and a very small amount of thiophosphonic acid. Base is added several times followed by $CO_2$ and finally with thiophosphonic acid.

---

The present invention relates to a process for manufacturing detergent inhibitor additives consisting of the colloidal dispersion of an alkali metal or alkaline earth metal salt in an oily solution of an alkyl phenol and a thiophosphonic acid. The alkyl phenol has sufficient molecular weight for its alkaline or alkaline earth salt to be soluble in the oil and have for preference the lowest possible molecular weight. The thiophosphonic acid is derived from the treatment of a polyolefin of molecular weight over 300 and preferably between 700 and 1000, with a quantity of $P_2S_5$ of between 5 and 20% by weight.

Additives of this type are well known and are regularly employed in lubricant compositions used for lubricating diesel, and above all petrol engines. It is also well known that the performance of these additives varies with their composition, an additive containing much alkyl phenol and little colloidal alkali metal earth or alkaline salt being less stable thermally than an additive containing a little alkyl phenol and much metal salt.

According to the usual process for making this type of additive, there are added simultaneously a hydrated base, either in solution or dispersed in water, and an acidic gas to a mixture containing oil, alkyl phenol and thiophosphonic acid. This process is satisfactory for the preparation of additives containing little metal and much alkyl phenol, and therefore having poor heat stability. On the other hand, the application of this process to the preparation of more stable additives comes up against great difficulties, above all as regards fixing of the metal and filtering the product obtained.

The present invention is therefore concerned with a process making it possible to produce products having good thermal stability; it is characterised by the following three conditions:

(1) treatment by an acid gas of the alkali metal and alkaline earth base takes place in the presence of a very small quantity of thiophosphonic acid.
(2) the simultaneous addition of base and acid gas is excluded.
(3) the addition of the base takes place twice or several times.

By the term "alkali metal or alkaline earth metal base" is meant all the metal hydroxides derived from the metals in the first two groups of the periodic table of the elements, for example, lithium, sodium, potassium, calcium, and barium. The term "acid gas" refers to gases that may react with the bases defined above to furnish salts, for instance HCl, $NO_2$, $SO_2$, $N_2O_3$, $CO_2$ etc.

In the process according to the invention, barium hydroxide and carbon dioxide will be used for preference.

The process according to the invention therefore comprises the following operations:

A mixture of alkyl phenol, oil and a small fraction of the total quantity of thiophosphonic acid to be used is heated to about 100 to 150° C. During one or two hours, the first fraction of the monohydrated barium hydroxide is introduced gradually, nitrogen is blown in, and then $CO_2$ is injected. After introducing a further fraction of monohydrated barium hydroxide, further nitrogen and carbon dioxide is injected. Instead of barium hydroxide other alkali metal or alkaline earth metal bases may be used.

These operations are repeated if necessary until the whole of the barium hydroxide has been used.

The balance of the thiophosphonic acid is then introduced.

After blowing through with nitrogen for several hours, the product is filtered.

The different compositions of the additives can be defined with the aid of the following variables.

$a$ = concentration in percent by weight, of thiophosphonic acid in the final product.
$b$ = concentration in percent by weight, of barium alkyl phenate in the final product, calculated by allowing for all the alkyl phenol incorporated to be converted to barium alkyl phenate.
$m$ = concentration, in percent by weight, of barium carbonate in the final product, this concentration being calculated by allowing for all the alkyl phenol to be in the form of barium alkyl phenate and for the rest of the barium to be in the form of carbonate.

It is known that the obtaining of a sufficiently stable additive calls for the following conditions:

$m/b$ must be as large as possible and at least equal to 1.3.
$m/a$ must be between 1 and 1.5, the lower limit being dictated by the physical stability of the colloidal state, and the upper limit being dictated by the thermal stability of the finished product.

The process according to the invention makes it possible to obtain products that conform to these conditions.

It therefore takes the form of the addition to 100 parts by weight of an oily solution containing between 10 and 30%, and preferably between 20 and 25% by weight of alkyl phenol, and between 2 and 15%, and preferably between 4 and 8% by weight of thiophosphonic acid, 40 to 70 parts by weight of monohydrated barium hydroxide, and preferably 50 to 55 parts, two or more times with, between each addition, nitrogen blown in to remove the excess of water from the reaction medium, and treatment with $CO_2$ to convert the whole of the barium hydroxide into barium carbonate. After the last treatment with $CO_2$, a quantity varying between 10 and 100 parts, and preferably 20 to 25 parts by weight of thiophosphonic acid is incorporated before blowing with nitrogen and filtration.

As has already been stated, the carbonation of the barium hydroxide, takes place in the presence of a very small quantity of thiophosphonic acid. It has in fact been discovered that the thiophosphonic acid, whose role is to stabilise the colloidal dispersion of barium carbonate, is at the same time a carbonation inhibitor. Carbonation will take place in the presence of the smallest quantity of thiophosphonic acid permitting a provisional stability of the colloidal dispersion. This quantity will be between 10 to 25 e.g. between 10 and 20% by weight of the total quantity of thiophosphonic acid to be used, this quantity being defined by the ratio $m/a$, whose limits have previously been defined. The remainder of the quantity of thiophosphonic acid is incorporated after carbonation and before filtration.

According to a further characteristic of the process, the barium hydroxide and the carbon dioxide are not admitted simultaneously. Indeed, when the desired value of the ratio $m/b$ is large, part of the hydrated barium hydroxide becomes carbonated, yielding non-colloidal metal carbonate, which causes a reduction in the proportion of addition of barium and filtration difficulties. Thus, in the process according to the invention, the hydrated barium hydroxide will be admitted to the charge containing the oil, the alkyl phenol and part of the thiophosphonic acid. After this introduction, a slight blowing through of nitrogen is effected to eliminate the excess of water carried along by the hydrated, barium hydroxide and $CO_2$ is injected until the barium hydroxide has been completely transformed into colloidal barium carbonate.

Finally, the addition of barium hydroxide is carried out several times. Indeed, when the desired value of the ratio $m/b$ is high, i.e. when large quantities of hydrated barium hydroxide are incorporated with small quantities of alkyl phenol in solution in oil and thiophosphonic acid, the mixture obtained is often very difficult to stir and therefore carbonation is difficult. In this case, it will therefore be as well to incorporate a portion of the proposed quantity of hydrated barium hydroxide which may amount to about half, to blow in nitrogen, then effect carbonation and, once or several times, to add the rest of the hydrated barium hydroxide, blow through with nitrogen and further carbonation.

It is obvious that the parameters $a$, $b$ and $m$, as well as the quantities of reagents above can be calculated for all the cases by replacing a weight of barium or $CO_2$ by the weight of another metal or another acid gas representing the same number of molecules or equivalents.

The additive according to the invention can be used as combustion improver for fuel oils in the proportion of 0.5 to 5% by weight, and as inhibiting detergent in lubricants in the proportion of 1 to 7% by weight. It may then be associated with other inhibiting detergents, as for instance zinc dialkyldithiophosphate.

EXAMPLE (1) A reactor was charged with 730 litres or 680 kg. undistilled nonyl phenyl (obtained by the reaction of tripropylene on phenol in the presence of $BF_3$) 2500 litres, or 2080 kg., diluent oil of viscosity 33 cst. at 37.5° C.; 230 litres of an 80% solution in oil of a thiophosphonic acid obtained by treating at 220° C. 100 parts of a polyisobutylene of molecular weight 780 with 15 parts $P_2S_5$ (this quantity corresponds to 160 kg. pure thiophosphonic acid).

After heating this mixture to 125-130° C. over a period of 2 hours 750 kg. monohydrated barium hydroxide were added then, still at the same temperature, 15 m.³ nitrogen were injected for 1 hour. The $CO_2$ was then injected with a delivery of 42 m.³/h. for 2 hours. The temperature had reached 135-140° C. After stopping the injection of $CO_2$, 750 kg. monohydrated barium hydroxide were then added and the same operations were resumed (15 m.³/h. $N_2$ for 1 hour and 42 m.³/h. $CO_2$ for 3 hours). 1070 litres of the same solution of thiophosphonic acid as before, or 775 kg. pure thiophosphonic acid, were then added, and after blowing with 15 m.³/hour nitrogen for 2 hours, the product was filtered through filtration earth. 5320 kg. of a product that filtered very easily was obtained and this contained 19.6% barium, which supplied a proportion of barium addition of 96%. The characteristics of this product, according to the foregoing definitions, were:

$$m/a = 1.28 \text{ and } m/b = 1.35$$

The original quantity of thiophosphonic acid corresponded to 17.2% of the total quantity.

(2) By way of comparison, the same operation was carried out with the aid of the same reactants, according to a usual process. The charge consisted of 730 litres nonyl phenol, 2500 litres of oil and 1300 litres of the solution containing 80% thiophosphonic acid. After this mixture had been heated to 125-130° C., 1500 kg. monohydrated baryta were then added in 8 hours, while the $CO_2$ was injected with a delivery of 42 m.³/h. for the same period. After the temperature had reached 145-150° C., the product was heated to 150° C. in a stream of nitrogen and then filtered on filtration earth, which filtration was very difficult, had to be restarted several times to obtain a product free from sediments. In the end, 4900 kg. of a product containing 18.2% barium were obtained, which corresponds to a proportion of addition of barium of 82%. As the barium was not well incorporated, the composition of this product differs from that of the product obtained above. Taking into account the filtration losses, the characteristics of this product were essentially:

$$m/a = 1.11 \text{ and } m/b = 1.17$$

(3) Two Petter WI tests were carried out for products 1 and 2.

The characteristics of the oil were as follows: 7.38% by weight of a paraffin oil with viscosity at 37.8° C. of 33 cst. and a viscosity index of 105.87, 90% by weight paraffin oil with viscosity at 37.8° C. of 128 cst. and a viscosity index of 95, 3.65% of the weight of the additive being tested, diluted to reduce its barium content to 15% by weight, 1.07% by weight of a corrosion inhibitor based on zinc dialkyl thiophosphate.

The characteristics of the engine were as follows:

Type: single cylinder petrol
Bore (mm.)—85
Stroke (mm.)—82.5
Cylinder capacity (cc.)—470
Speed—1500 r.p.m.
Output (HP)—3
Compression ratio—5.0/1

The test, which listed 36 hours, gave the following results:

| | Product 1 | Product 2 |
|---|---|---|
| Loss of weight of bearnings | 9.9 | 12.4 |
| Rating for piston shirt/10 | 10 | 9.95. |
| Varnish at bottom of piston | 20% brown, 70% pale brown. | 80% black, 20% brown-black. |
| Rating for oil scraper deposit/10 | 10 | 10. |
| Deposit groove No. 1 | Clean | 15% pale varnish. |
| Deposit groove No. 2 | 10% pale varnish | 40% brown varnish. |
| Deposit groove No. 3 | Clean | 90% brown varnish. |

These results clearly show the effect of the process according to the invention on the quality of the product obtained.

What is claimed is:

1. A process for making detergent-inhibitor additives comprising a colloidal dispersion of alkali metal or alkaline earth metal salt in an oil solution of an alkyl phenol and a thiophosphonic acid derived from the reaction of a polyolefin of molecular weight above 300 with between 5 and 20% by weight of $P_2S_5$, in which process an alkali metal base is treated with an acidic gas in a mixture of alkyl phenol and oil in the presence of a small portion of said thiophosphonic acid, there being at least one further addition of base, each addition of base being separate from, and preceding an addition of acidic gas, and the balance of said thiophosphonic acid being added after the neutralization of substantially all the base.

2. A process as claimed in claim 1, wherein the alkaline earth metal base is mono-hydrated barium hydroxide.

3. A process as claimed in claim 1, wherein the acidic gas is carbon dioxide.

4. A process as claimed in claim 2, wherein the oil solution of the alkyl phenol contains between 10 and 30% by weight of alkyl phenol, and between 2 and 15% by weight of thiophosphonic acid.

5. A process as claimed in claim 2, wherein to 100 parts by weight of the oil solution of the alkyl phenol there are added a total of from 40 to 70 parts by weight of monohydrated barium hydroxide.

6. A process as claimed in claim 2, wherein the balance of thiophosphonic acid represents from 10 to 100 parts by weight per 100 parts by weight of the initial oil solution of alkyl phenol.

7. A process as claimed in claim 2, wherein the total quantity of thiophosphonic acid originally used represents 10 to 25% by weight of the quantity of acid to be used, this latter quantity being defined by the ratio $m/a$, which must be between 1 and 1.5 and in which:

"$a$" repersents the concentration in percent by weight of the thiophosphonic acid in the final product, and "$b$" represents the concentration in percent by weight of barium carbonate in the final product, this concentration being calculated by allowing for all the alkyl phenol to be present in the form of barium alkyl phenate and for the rest of the barium to be in the form of carbonate.

8. A process as claimed in claim 7, wherein the quantity of monohydrated baryta is such that a ratio $m/b$ is obtained at least equal to 1.3, $b$ representing in percent by weight, the concentration of barium alkyl phenate in the final product calculated by allowing for all the alkyl phenol introduced to be in the form of barium alkyl phenate.

9. A process as claimed in claim 1, wherein in a first stage during 1 to 2 hours, a first solution heated to 100–150° C. of alkyl phenol, and a small fraction of thiophosphonic acid, whilst purging with nitrogen and injecting $CO_2$, the rest of the metal base then being added in successive fractions treated respectively by an injection of nitrogen and $CO_2$, the rest of the metal base then being added in successive fractions treated respectively by an injection of nitrogen and $CO_2$, the balance of the thiophosphonic acid finally being added and filtration taking place after blowing with nitrogen for several hours.

References Cited

UNITED STATES PATENTS 2,616,904  11/1952  Asseff et al. _____ 252—32.7

DANIEL E. WYMAN, Primary Examiner

I. VAUGHN, Assistant Examiner

U.S. Cl. X.R.

44—51; 252—42.7